United States Patent [19]

Duehren et al.

[11] Patent Number: 4,918,722
[45] Date of Patent: Apr. 17, 1990

[54] CONTROL OF ELECTRONIC INFORMATION DELIVERY

[75] Inventors: David W. Duehren, Belmont; Eric R. Giler, Wellesley Hills; Stephen A. Ide, Needham, all of Mass.

[73] Assignee: Brooktrout Technology, Inc., Wellesley Hills, Mass.

[21] Appl. No.: 192,839

[22] Filed: May 11, 1988

[51] Int. Cl.$^4$ .................. H04M 11/00; H04N 1/21
[52] U.S. Cl. ................... 379/100; 358/403; 358/407
[58] Field of Search ........ 379/100, 88, 98, 97, 379/96, 95, 93, 89; 358/257, 263, 402, 403, 407, 440

[56] References Cited

U.S. PATENT DOCUMENTS

| | | | |
|---|---|---|---|
| 3,920,896 | 11/1975 | Bishop et al. | 379/100 |
| 3,995,106 | 11/1976 | Wern et al. | 178/6.8 |
| 4,091,424 | 5/1978 | Widergren | 358/263 |
| 4,106,060 | 8/1978 | Chapman, Jr. | 358/256 |
| 4,115,765 | 9/1978 | Hartke | 340/324 |
| 4,245,257 | 1/1981 | Yamazaki et al. | 358/260 |
| 4,340,783 | 7/1982 | Sugiyama et al. | 379/100 |
| 4,371,752 | 2/1983 | Matthews et al. | |
| 4,500,751 | 2/1985 | Darland et al. | 379/100 |
| 4,504,868 | 3/1985 | Hasuike et al. | 358/280 |
| 4,513,390 | 4/1985 | Walter et al. | 364/900 |
| 4,573,083 | 2/1986 | Shimizu | 358/257 |
| 4,584,434 | 4/1986 | Hashimoto | 379/100 |
| 4,587,633 | 5/1986 | Wang et al. | 364/900 |
| 4,613,907 | 9/1986 | Yoshimoto et al. | 358/257 |
| 4,614,978 | 9/1986 | Doster et al. | 358/263 |
| 4,635,253 | 1/1987 | Urui et al. | 370/67 |
| 4,642,697 | 2/1987 | Wada | 379/100 |
| 4,652,700 | 3/1987 | Matthews et al. | 379/89 |
| 4,652,933 | 3/1987 | Koshiishi | 358/256 |
| 4,654,718 | 3/1987 | Sueyoshi | 379/100 |
| 4,660,218 | 4/1987 | Hashimoto | 379/93 |
| 4,667,248 | 5/1987 | Kanno | 358/280 |
| 4,769,719 | 9/1985 | Endo | 358/257 |

FOREIGN PATENT DOCUMENTS 0048206 1/1982 United Kingdom ............ 358/257

OTHER PUBLICATIONS

Pacific Image Communications, "Introducing Pic SuperFax", Brochure, Exhibit A.
Brooktrout Technology, Inc., "The Office Manager", Sketch, Exhibit B.
Brooktrout Technology, Inc., Activity Log, "Exhibit C".
Invoice and Payment Check, Steve Elias (Programmer), "Exhibit D".
Brooktrout Technology, Inc., Activity Log, "Exhibit E".
Converse Technology, Inc., "Trilogue, Message Management System", Brochure, Voice 88 Trade Show, 6/15/88.

Primary Examiner—Keith E. George
Attorney, Agent, or Firm—Fish & Richardson

[57] ABSTRACT

Delivery of binary encoded character data and facsimile encoded data to a specified recipient is controlled rapidly, simply, and with versatility, by, e.g., DTMF commands sent by a user.

5 Claims, 5 Drawing Sheets

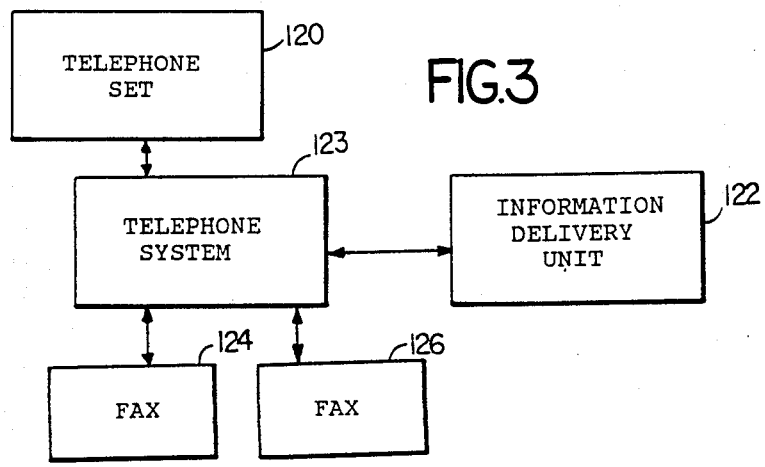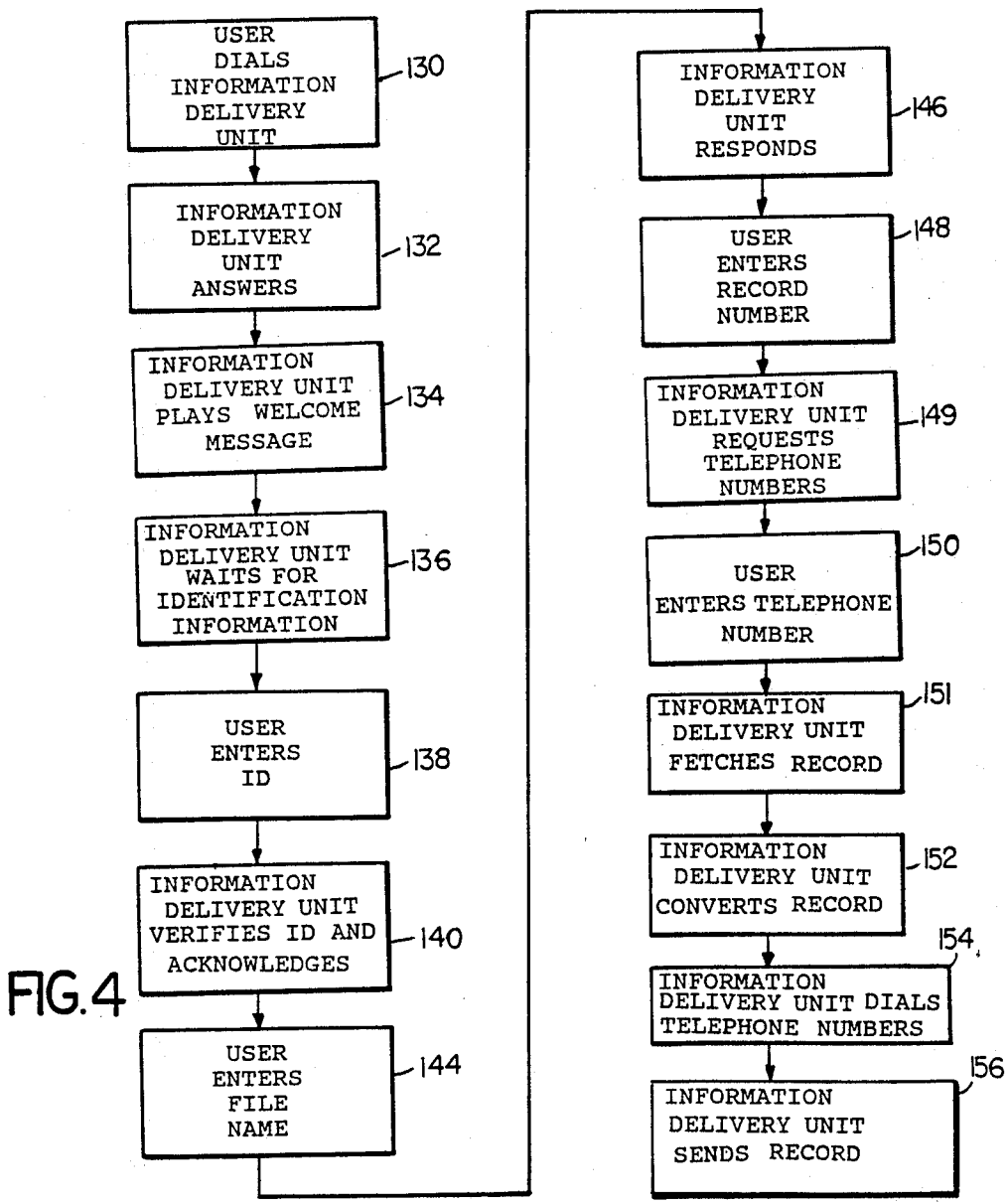

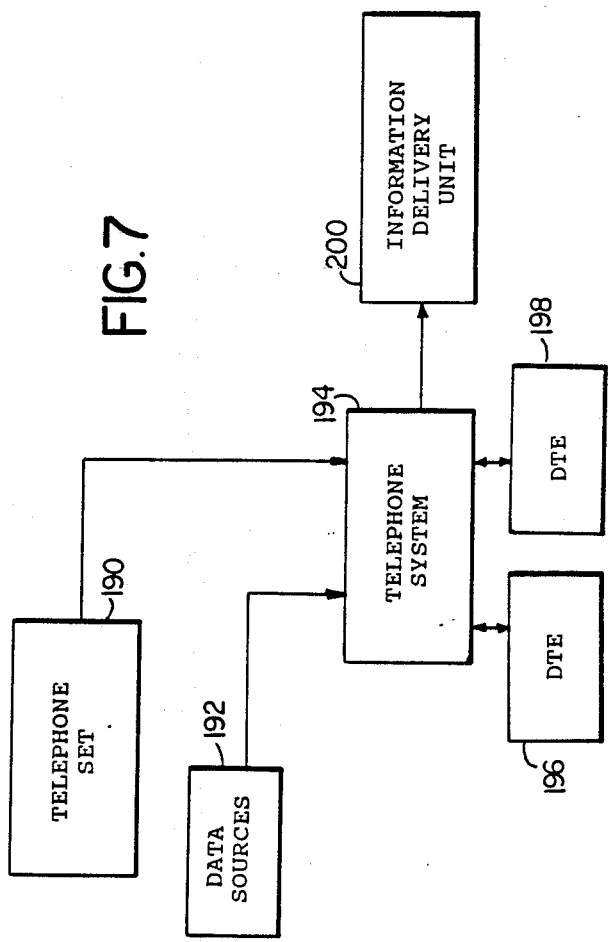
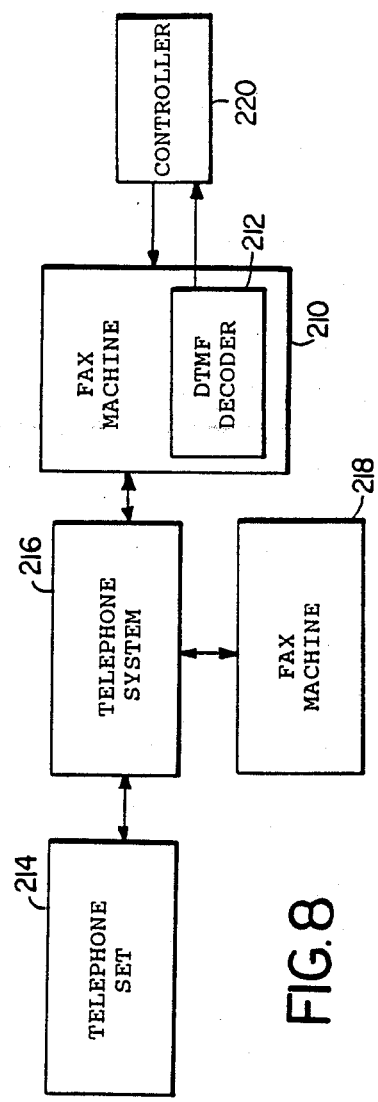

CONTROL OF ELECTRONIC INFORMATION DELIVERY

BACKGROUND OF THE INVENTION

This invention relates to electronic delivery of information.

Conventional facsimile machines, for example, use the public switched telephone system to send copies of images of, e.g., documents, to specified recipients anywhere in the world. The sender dials the telephone number of the receiving party's facsimile machine. When a connection is made, he feeds the document into his own machine, which digitizes the image, conforms the digital data to one of standard facsimile protocols, and sends it via a modem onto the telephone line. At the receiving end, another facsimile machine generates a copy of the original document based on the received digital data.

SUMMARY OF THE INVENTION

In general, in one aspect of the invention, a user can control the delivery of binary encoded character data or facsimile encoded data to a specified recipient by a versatile, rapid, and simple method in which DTMF encoded delivery commands, sent by the user, are received and then responded to by delivering the data to the specified recipient.

In another aspect of the invention, a user having access to a telephone can cause facsimile encoded data to be sent from a facsimile compatible sending device to a specified recipient via a telephone system by a method in which (i) encoded commands received from the user's telephone via the telephone system are decoded, and (ii) the sending device is caused to transmit the data via the telephone system to the recipient in accordance with the commands. In another aspect of the invention, a user can obtain a tangible copy of data selected from a stored data base of information by a method in which (i) commands are received from the user, (ii) in response to the commands, the selected data is fetched from the data base and delivered in facsimile encoded form to the user's location, and (iii) at the user's location, the facsimile encoded data is received and the tangible copy is generated.

Preferred embodiments of the invention include the following features. The delivery commands from the user specify what data is to be transmitted, and identify the recipient (or his telephone number). In some embodiments multiple recipients are specified in the delivery commands. Responses (for example, audible or visual messages generated from stored digital data) are delivered to the user to aid the user in sending the delivery commands. In some cases, the user and the recipient are one and the same and the terminal and the receiving device are in the same location thus enabling the user to directly obtain the information from the sending device. In other cases the user and the recipient are separated. The receiving device may include a computer, a receiver, and a printer. The user's terminal may include a local facsimile compatible transmitting device and the data may be first sent from the local transmitting device to the facsimile compatible sending device. The facsimile compatible receiving device may be a facsimile machine.

In another aspect, the invention features apparatus including a port for receiving DTMF encoded delivery commands sent by the user and for delivering the data to the specified recipient via a data communications channel, a DTMF decoder for decoding the delivery commands, and circuitry for causing the data to appear at the port in response to the delivery commands.

In another aspect, the invention features apparatus including a DTMF decoder for decoding commands received from the user, and a controller for causing the sending device to transmit the data in facsimile encoded form to the recipient via the facsimile link in accordance with the commands.

In another aspect, the invention features apparatus including a port for connection to a telephone system, a decoder connected to the port for decoding commands received via the telephone system, and an information retrieval system connected to the decoder and to the port and responsive to the commands to retrieve selected data and send it in facsimile encoded form via the port to the telephone system for delivery to a selected recipient.

In preferred embodiments, the decoder includes a voice response apparatus for sending voice messages via the port, and a DTMF signal decoder.

The invention enables versatile, rapid, simple control of the electronic delivery of information, and may be implemented with readily available equipment. Any telephone may serve as the device for entering the delivery commands. Hard copy can be delivered at any FAX machine. Data bases may be accessed remotely to generate hard copy. Information may be broadcast to a number of recipients.

Other advantages and features will become apparent from the following description of the preferred embodiment, and from the claims.

DESCRIPTION OF THE PREFERRED EMBODIMENT

We first briefly describe the drawings.

FIGS. 3, 5, 7, 8 are block diagrams of representative information delivery schemes.

FIGS. 4, 6 are flow charts of representative information delivery procedures.

STRUCTURE

Figure 1:
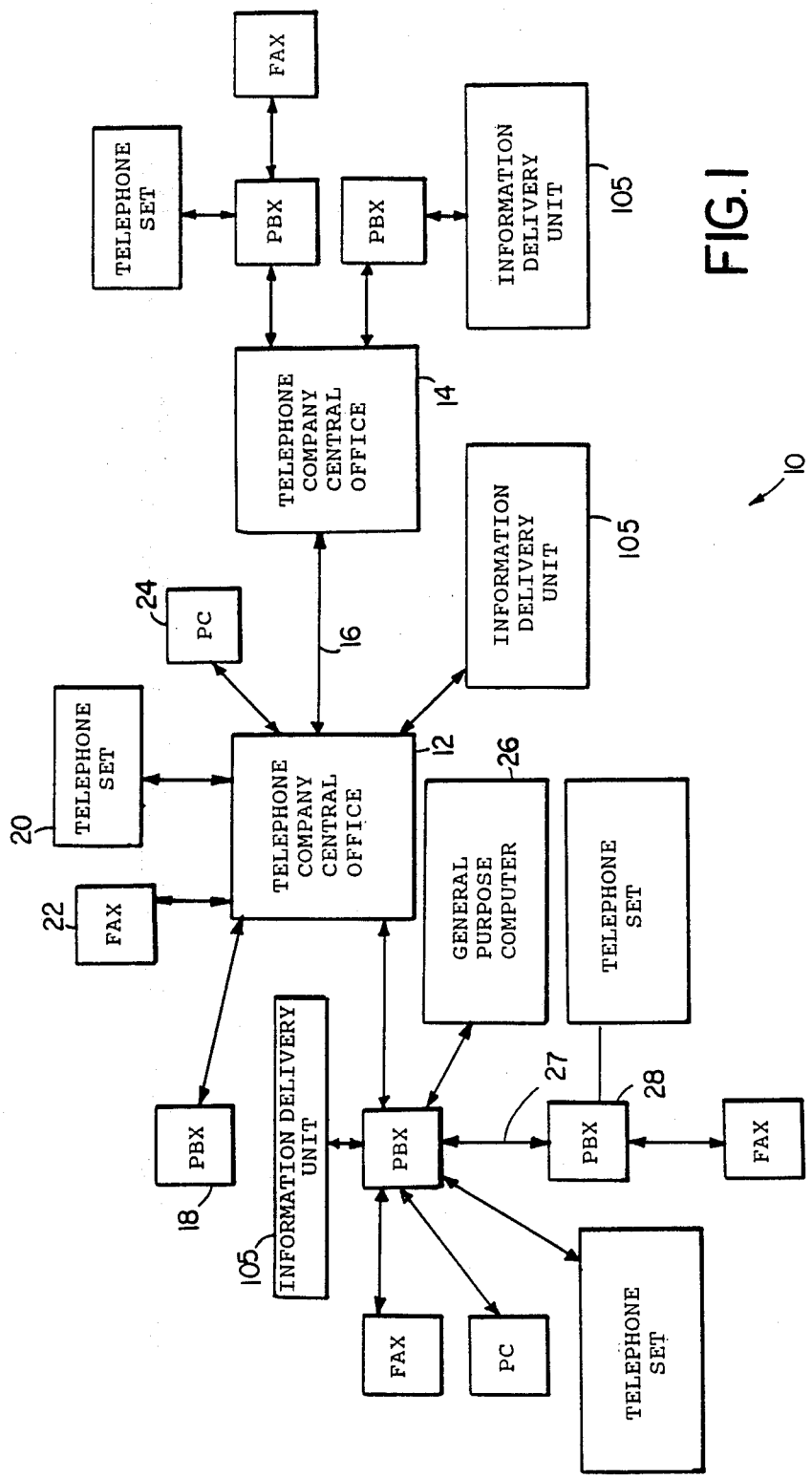
FIG. 1 is a block diagram of the international telephone system.

The international telephone system 10 (only a tiny representative part of which is shown) includes telephone company central offices 12, 14 interconnected by links 16. Tied to each central office are many private branch exchanges (PBXs) 18, telephone sets 20, and (via modems not shown) facsimile machines (FAXs) 22 and personal (and other types of) computers 24, 26. Properly equipped, a computer may provide some or all of the functions of a facsimile machine.

Each PBX may serve a similar range of devices and itself be connected, via, e.g., a dedicated line 27, to other PBXs 28. A myriad of other public and private communication links are possible and a variety of other types of equipment may also be served by the telephone system.

In the invention, the electronic delivery of information via the telephone system to any recipient anywhere in the world can be controlled simply and quickly from any telephone in the world. Delivery instructions can be entered via the usual keypad of a TOUCH-TONE (DTMF) telephone.

Figure 2:
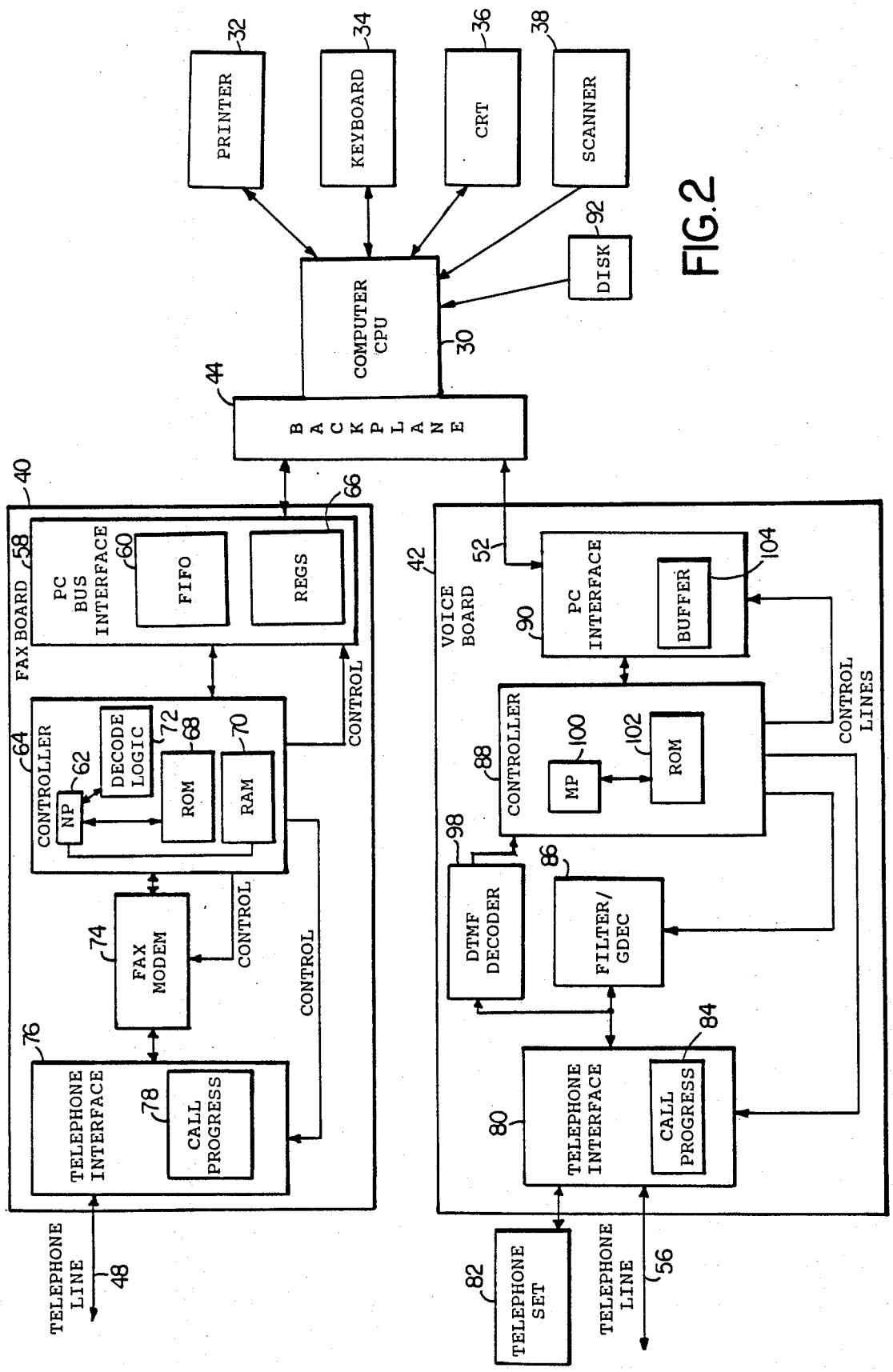
FIG. 2 is a block diagram of an information delivery unit.

Referring to FIG. 2, for example, a personal computer 30 equipped with a printer 32, a keyboard 34, a document scanner 38, and a CRT 36, may be enhanced by a facsimile (FAX) board 40 and a voice board 42 to enable delivery of facsimile-compatible data under control of a local or remote telephone.

The FAX board 40 is connected via a backplane 44 to a computer CPU 30 and is also connected via a telephone line 48 to the telephone system. The backplane 44 serves as a communication bus which includes data, address, control, clock, power and ground lines. Voice board 42 is connected via the backplane 44 but is accessed at a different bus address, also called a port. Voice board 42 is is also connected to a telephone line 56. Alternatively, the FAX board function could be served by an external FAX device connected to the computer by a different communication link (e.g., an RS-232 port).

FAX board 40 includes a PC bus interface 58 having a FIFO buffer 60 which buffers data between computer 30 and a microprocessor 62 in a controller 64. Bus interface 58 also includes several registers 66 for receiving and sending data and commands. Controller 64 also includes a ROM 68, a RAM 70, and instruction decode logic 72. Microprocessor 62 controls the operation of the FAX board based on programs stored in ROM 68. Controller 64 passes data back and forth to the telephone line 48 via a FAX modem 74 and a telephone interface 76.

FAX modem 74 may include a conventional set of digital signal processor chips and analog circuitry operated in accordance with CCITT communication standards to drive and receive modulated carrier signals on the telephone line.

Telephone interface 76 includes conventional two-wire to four-wire hybrid circuitry, hazardous voltage protection, ring detectors, and a call progress unit 78.

The modulation requirements of the CCITT facsimile standard are satisfied by the FAX modem. The CCITT call sequence requirements (including pre-message and post-message handshaking) are implemented in software stored in ROM 68, and the CCITT encoding and decoding protocol for the FAX data is implemented in software that runs on computer 30, so that the data carried on backplane 44 is in FAX form. Alternatively, the CCITT call sequence control could be implemented in the FAX board.

Computer 30 communicates with and controls the FAX board by commands sent through the bus interface 58, and the controller communicates with the computer via interrupts and the bus interface.

Voice board 42 includes a telephone interface 80 connected to the telephone line 56. Voice board 42 is used in conjunction with a telephone set 82. When board 42 is inactive, telephone set 82 is connected to line 56; otherwise board 42 is able to "answer" telephone set 82 to receive incoming messages or may be connected to set 82 to record outgoing messages. Interface 80 is also capable of autodialing outgoing calls, using standard dual-tone multi-frequency (DTMF) signals to address the telephone system. A call progress unit 84 is part of interface 80.

The incoming voice signal on line 56 is passed via interface 80 to a filter/codec 86 where it is filtered and digitized by continuously variable delta slope (CVDS) modulation encoding. The digitized message is passed via a controller 88, a PC interface 90, and link 52 for storage in a disk memory 92 associated with computer 30. Outgoing messages are delivered from computer 30 via the reverse path to filter/codec 86 where they are reconverted by CVSD to analog form and sent to the telephone line 56.

DTMF-encoded signals received on telephone line 56 are sent from interface 80 to a DTMF decoder 98 which decodes them into corresponding characters to be returned to computer 30 via controller 88, interface 90, and backplane 44.

Controller 88 includes a microprocessor 100 that controls the voice board based on a stored program in a ROM 102. Interface 90 has a buffer 104 for buffering the data on line 52.

The circuitry of FIG. 2, including the computer 30 and its peripherals, may be considered an information delivery unit. One or more information delivery units 105 may be connected to the public telephone system as suggested in FIG. 1.

OPERATION

In operation, the delivery of information using the information delivery unit may be controlled in a wide variety of ways.

For example, referring to FIG. 3, suppose that a user having access to a telephone set 120 in one city wishes to send information stored on the disk of an information delivery unit 122 (located in a second city) via the public telephone system 123 to two other users who have access respectively to conventional FAX machines 124, 126 (located in third and fourth cities).

Referring also to FIG. 4, the initiating user would dial (130) the telephone number of the information delivery unit (IDU), which would automatically answer (132) and send back a digitized voice message (134) stored in its disk, for example, "Welcome. Please enter your identification number." The information delivery unit would then wait (136) for the identification information, which the user would enter (138) via his telephone's TOUCH-TONE (DTMF) keyboard. The DTMF signals would be decoded and sent to the computer 30 (FIG. 2) which would verify the identification information (140) and would send back another voice message, such as "Thank you. Please identify the file name". The user would then enter (144) the identification number of the file which holds the information that he wishes to send. The information delivery unit would respond (146), for example, "Thank you. Please indicate the record number within file __". The user would enter (148) the record number. The information delivery unit would then request (149) the telephone numbers of the intended recipients, which would be entered (150) in order by the user. The information delivery unit would fetch the record (151), convert it to facsimile form (152), dial the telephone numbers of the FAX machines (154) of the intended recipients (154) and, when each one answers and a connection is established would send (156) the record in facsimile data form via the FAX board to each of them, all automatically.

Figures 5, 6:
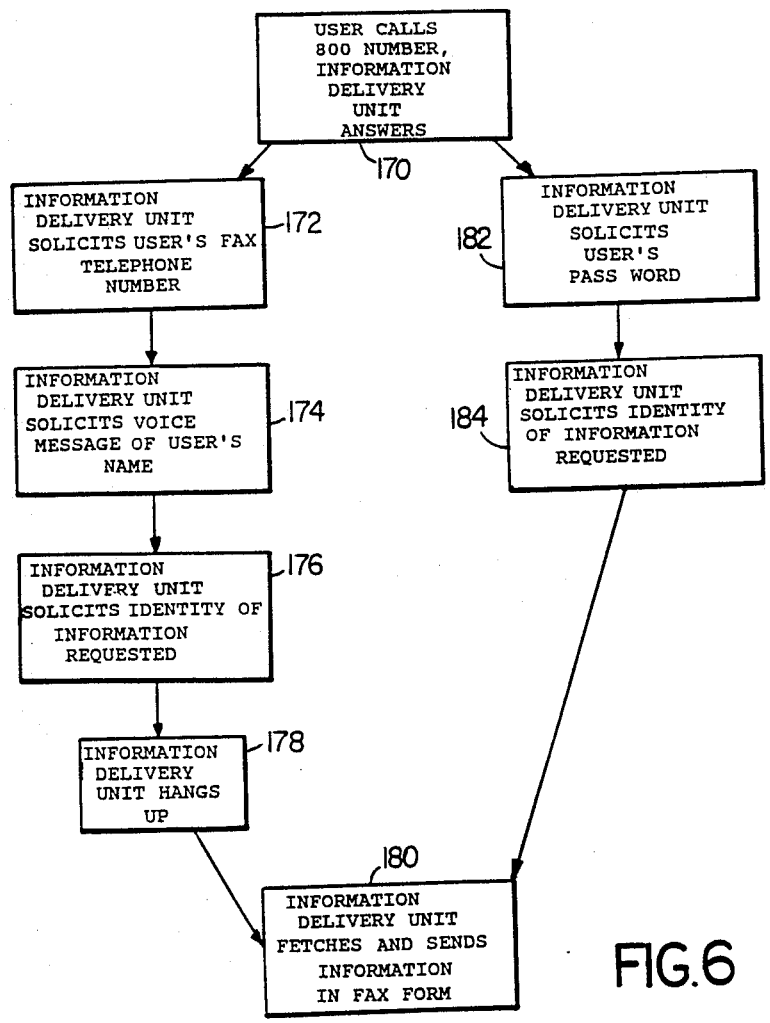

Referring to FIG. 5, in another application, a vendor of data base information 160 may wish to give access to the information via the public telephone system 162 to a paying subscriber (or even to a non-subscriber) having access to a telephone set 164 and a FAX machine 166. The vendor would connect the stored data base to an information delivery unit 168, and provide its users with an "800" number to call the information delivery unit.

Referring also to FIG. 6, the user would call (170) the 800 number, and the information delivery unit would answer the telephone and play a prerecorded welcoming message. At this point, one of two alternate schemes may be used.

In one scheme, in which the service would be available free to any caller, the information delivery unit would solicit the facsimile telephone number of the user (172), which the user would enter via the TOUCH-TONE (DTMF) pad of his telephone. The information delivery unit would then solicit and record (174) the user's name and perhaps other information, which the user would enter by voice. His voice would be digitized by the codec and stored in the disk of the computer. This information could be useful for making call backs or for other purposes. Next, the information delivery unit would solicit (176) the identity (e.g., file and record) of the information requested. Then the information delivery unit would hang up (178) and fetch and send (180) the requested information to the user's FAX machine in facsimile form.

In an alternative scheme, the user would be charged for each use of the data base. The user would enter a password (182) which would not only allow access to the system but would also trigger the generation of billing information by the computer. As before, the information delivery unit would then solicit (184) the identity of the information requested.

In an alternative of FIG. 5, the telephone set 164 and FAX machine 166 could be combined in a single unit to be located publicly, e.g., in a manner similar to an automated teller machine. Anyone (or a paying subscriber only) could then obtain a hard copy of selected information from the vendor's data base at the public terminal.

Referring to FIG. 7, in an alternative scheme, a user having access to a telephone set 190 and a source of binary data 192 (e.g., an ASCII chararacter file) may wish to deliver the data via the telephone system 194 to other users having data terminal equipment 196, 198. The user at telephone set 190 would send delivery instructions (e.g., the telephone numbers of the recipient) to information delivery unit 200 by keying TOUCH-TONE (DTMF) signals in response to voice prompts from the information delivery unit 200. The user would then cause his data source 192 to send the data file to information delivery unit 200 where it would be stored temporarily. Unit 200 would then dial each of the DTEs and send the binary data to them as specified by the TOUCH-TONE (DTMF) instructions.

Referring to FIG. 8, in an alternative scheme, a modified FAX machine 210 equipped with a DTMF decoder 212 and a controller 220 serves as the information delivery unit. Instructions could be sent from a telephone set 214 via the telephone system 216, without any interactive voice response. The information to be delivered could be information sent from a FAX machine 218, accessible to the user located at telephone set 214. For example, a user may wish to send a block diagram to several recipients. He could call FAX machine 210, and, when the line is answered, immediately enter the telephone numbers of the recipients' FAX machines, serially, then send the document to FAX machine 210 from his local FAX mahine 218.

Controller 220 would cause FAX machine 210 to store the incoming FAX data and then resend it to the specified recipients.

Other embodiments are within the following claims. For example, the voice board and FAX boards could be combined in a single board connected to a single telephone line. Additional capability could be included in such a board so that a separate host computer would not be needed. A conventional FAX machine could be modified by adding voice response and DTMF decoding capabilities to serve as the information delivery unit. Or a FAX machine capable of being controlled by a computer via a port (e.g., an RS-232 port) could be connected to a computer equipped with a voice board. The FAX board could be a self-powered independent unit. The voice function could be provided by more sophisticated call processing software that eventually causes the data to be sent.

The interaction between the user and the information delivery unit could include non-voice responses (e.g., visual responses to be displayed on a display device), and a variety of response messages and sequences of messages. The information delivery unit could store and generate reports of the usage of the functions provided by the unit. Binary data and voice response messages could be stored on other types of storage media, e.g., optical disks. Various devices could substitute for the conventional telephone set provided they are capable of sending, e.g., DTMF-encoded information. The communication system that carries the delivery instructions and the FAX data need not be part of the public telephone system and could include dedicated as well as switched lines. Pulse dialing signals or other encoding schemes could be used instead of DTMF signals. More complicated selection trees could be used to enable the user to make a detailed selection of information to be sent. Files could be selected not only by number but by spelling out file names. Files could be pre-encoded and stored in FAX form rather than being encoded in FAX form after they are selected for transmission. Where a group of recipients is regularly to receive transmissions, their telephone numbers can be accessed by a single command, e.g., the command 203 could refer to a group of 75 customers to whom the same FAX is to be sent, thus eliminating the need to repeatedly enter all 75 telephone numbers.

The information could be delivered to the telephone line directly as binary encoded character data (e.g., ASCII characters, graphic characters, or any other forms of computer symbols or characters) without conversion to or reconversion from FAX form, and in this way DTMF commands may be used to deliver any type of computer file.

We claim:

1. A method for causing a selected message to be sent from a first location to any specified remote location accessible from the first location via the public switched telephone system, comprising storing, at the first location, messages including the selected message, thereafter, receiving at the first location, via the public switched telephone system, delivery commands issued by any remote telephone device, said commands identifying said selected message and said specified remote location, decoding said commands to identify the selected message and the specified remote location, fetching said selected message from among said messages, initiating a telephone call to said specified remote location, and sending to a facsimile-capable receiving device at said specified remote location via the public switched telephone system said selected message in facsimile compatible form.

2. The method of claim 1 adapted for causing said selected message to be transmitted to multiple remote locations and wherein said delivery commands specify the multiple remote locations.

3. The method of claim 1 further comprising providing responses to a user to aid said user in causing said remote telephone device to issue said delivery commands.

4. The method of claim 1 wherein said facsimile-capable receiving device comprises a computer, a receiver, and a printer.

5. The method of claim 1 wherein said facsimile-capable receiving device comprises a facsimile machine.

* * * * *